(12) United States Patent
Shell

(10) Patent No.: US 6,449,215 B1
(45) Date of Patent: Sep. 10, 2002

(54) THREE-DIMENSIONAL IMAGING SYSTEM FOR SONAR SYSTEM

(75) Inventor: Richard R. Shell, Riverside, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/973,178

(22) Filed: Oct. 9, 2001

(51) Int. Cl.[7] .......................... G03B 42/06; G01S 15/89
(52) U.S. Cl. .............................. 367/7; 367/88
(58) Field of Search ............................. 367/7, 131, 87, 367/88

(56) References Cited

U.S. PATENT DOCUMENTS

| | | | | |
|---|---|---|---|---|
| 4,694,434 A | * | 9/1987 | von Ramm et al. | 367/7 |
| 4,815,045 A | * | 3/1989 | Nakamura | 367/88 |
| 5,200,931 A | * | 4/1993 | Kosalos et al. | 367/88 |
| 5,699,318 A | * | 12/1997 | Fischer | 367/88 |
| 5,812,494 A | * | 9/1998 | Medeiros | 367/88 |
| 6,002,644 A | * | 12/1999 | Wilk | 367/88 |

* cited by examiner

Primary Examiner—Ian J. Lobo
(74) Attorney, Agent, or Firm—Michael J. McGowan; James M. Kasischke; Michael F. Oglo

(57) ABSTRACT

A three-dimensional imaging system for use with a sonar system. The three-dimensional imaging system processes forward-looking sonar data, side-looking sonar data, bathymetric data, detection and cluster data, bottom sediment type data, and vehicle position and navigation data and renders a complete three-dimensional image of an ensonified region.

20 Claims, 2 Drawing Sheets

THREE-DIMENSIONAL IMAGING SYSTEM FOR SONAR SYSTEM

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Not applicable.

BACKGROUND OF THE INVENTION (1). Field of the Invention

The present invention generally relates to a three-dimensional imaging system and in particular, a three-dimensional imaging system that can be used to process sonar data and create a three-dimensional image based on that sonar data.

(2). Description of the Prior Art

Sonar data obtained from forward-looking sonar systems is typically displayed as range-azimuth and range-elevation plots. Range-azimuth and range-elevation plots are plots that relate intensity of objects to their position relative to the nose of the sonar. These displays are often color coded with the color red being used for areas of intense acoustic reflection and blue for areas of little reflection. These displays are extremely useful. However, these displays have several significant disadvantages. One disadvantage is that they cannot simultaneously show both the horizontal and vertical position of an object. Hence, one has to compare their positions and shapes by mentally combining various views of the highlighted objects. Another significant disadvantage is that the plots are usually provided in range-angle space coordinates instead of x-y-z Cartesian coordinates. Thus, range-azimuth and range-elevation plots are often difficult to visualize by humans.

Side-looking sonars, also known as side-scan sonars, also are typically two-dimensional displays in which gray scale level relates to the intensity of the return of the sonar. For example, shadows (regions having low return values) may be portrayed as dark areas and reflections as relatively lighter shaded objects. The stronger the reflection, the lighter the shade in which the object is displayed. The height of each object is determined solely by the shadow cast by the object. Furthermore, the display of this data is most often in the format of a continuous strip showing the outputs of the port and starboard sonar transducers separated by a blanked out region representing the altitude at which the side-scan was traveling above the ocean floor. The continuous strip displays neither provide an indication of the vehicle's heading nor are they in Cartesian coordinates. The viewer can obtain the side-scan sonar's position in global coordinates only by reading the latitude-longitude heading data recorded on a separate data channel. However, the global coordinates then have to be converted to Cartesian coordinates.

Various prior art imaging systems used in sonar applications are described in the following documents. Von Ramm et al., U.S. Pat. No. 4,694,434 discloses a three-dimensional imaging system using outputs from a two-dimensional transducer array. Nakamura, U.S. Pat. No 4,815,045 discloses a seabed surveying apparatus in which side-looking sonar data is combined with a multi-beam echo sounder data so that topographic and bathymetric data can be superimposed on a common X-Y coordinate display field. Kosalos et al., U.S. Pat. No. 5,200,931 discloses a volumetric and terrain imaging sonar system for generating a three-dimensional image wherein forward-looking and side-looking sonar data is combined into one image. Fischer, U.S. Pat. No. 5,699,318 discloses a video display system of that is configured to provide a video display of the bottom of a body of water using data collected from a side-looking sonar system. Medeiros, U.S. Pat. No. 5,812,494 describes a system for generating a wide-angle, forward-looking bathymetric map of the region ensonified by a single ping. Wilk, U.S. Pat. No. 6,002,644 discloses an underwater imaging system for surveying underwater topography using arrays of transducers. In one embodiment, the transducers are mounted on the side of a cylindrical body.

It is clear that there has existed a long and unfilled need in the art for a system that can simultaneously display forward-looking sonar data, side-looking sonar data, bathymetry data, bottom/sediment data, and vehicle and target data. The present invention meets this need while avoiding the aforementioned shortcomings of the techniques known in the prior art.

SUMMARY OF THE INVENTION

A first object of the invention is provision of sonar data as a three dimensional view.

Another object is the combination of various sonar sources with navigational information in order to provide a three dimensional view.

The present invention is directed to a three-dimensional sonar imaging system that processes forward-looking sonar data, side-looking sonar data, vehicle position and navigation data and renders a three-dimensional image of an ensonified region. The image is based on the processed data and, in one embodiment, comprises the simultaneous display of bathymetry data, bottom or sediment type data, side-scan sonar map data, navigation data, vehicle motion data, water surface data and detection/cluster data. In an alternate embodiment, each one of these data types can be displayed individually.

Thus, in one aspect, the present invention is directed to a method of generating a three-dimension image of a region ensonified by a source of acoustic signals. This includes the step of providing sonar data corresponding to the ensonified region wherein the sonar data include side-looking sonar data, bathymetric sonar data, detection and cluster data, and navigation data and altitude data relating to the position and movement of the source of acoustic signals. The navigation and altitude data is processed so as to format the navigation and altitude data into center-of-scenebounding coordinates. The method also includes processing the detection and cluster data, the bathymetric data, and the side-looking sonar data to produce geometry objects based on each data type. These objects are then rendered into a three-dimensional image comprising the geometry objects. The position of all geometry objects are offset in accordance with the center-of-scenebounding coordinates. The system then displays the rendered three-dimensional image with the objects offset.

In a related aspect, the present invention is directed to a three-dimensional imaging system for use with a sonar system that provides side-looking sonar data, bathymetric data, detection and cluster data, and navigation data and altitude data. The three-dimensional imaging system includes data receiving circuitry, a processor, and a display device. The data receiving circuitry reviews the side-looking sonar data, bathymetric data, detection and cluster data, navigation data, and altitude data. The processor converts the received navigation and altitude data into center-of-scenebounding coordinates, processes the received detection and cluster data, processes the received bathymetric data so as to produce geometry objects, processes the received side-looking sonar data to produce geometry objects, renders a three-dimensional image comprising the geometry objects based on the detection and cluster data, the bathymetric data and the three-dimensional side-looking sonar data, and offsets the position of all geometry objects in accordance with the center-of-scenebounding coordinates. The display device displays the rendered three-dimensional image.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

In describing the preferred embodiments of the present invention, reference will be made herein to FIGS. 1–2 of the drawings in which like numerals refer to like features of the invention.

Figure 1:
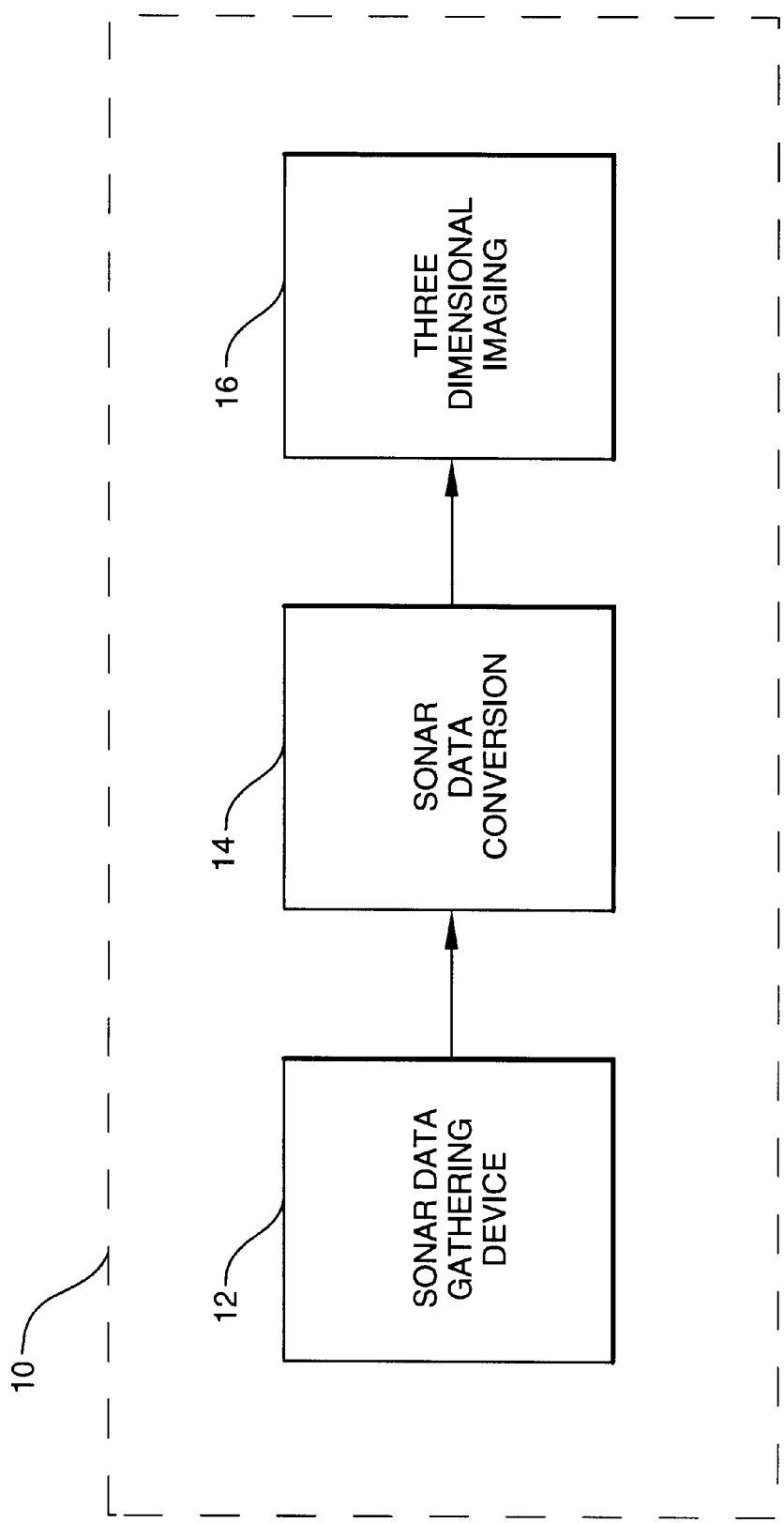
FIGS. 1 and 2 are block diagrams of a sonar system that utilizes the three-dimensional imaging system of the present invention.

Referring to FIG. 1, there is shown sonar system 10 which utilizes the three-dimensional imaging system of the present invention. Sonar system 10 generally comprises a sonar data gathering device 12, sonar data conversion module 14 and three-dimensional imaging module 16 of the present invention. Sonar data gathering device 12 provides sonar data corresponding to an ensonified region. Data conversion module 14 processes the sonar data provided by sonar data gathering device 12. In particular, data conversion module 14 performs particular signal processing algorithms on the sonar data. The processed sonar data is entered in the three-dimensional imaging module 16 which produces a three-dimensional image of the ensonified region. These features are described in detail in the ensuing description.

Sonar data gathering device 12 includes a high-resolution array (HRA) forward looking sonar (FLS) 18, a side-looking sonar (SLS) 20 and data acquisition processor (DAP) 22. Forward-looking sonar 18 provides a plurality of analog signals from transducers in the array. Data acquisition processor 22 consists of hardware/software that conditions each of the provided analog signals, performs analog-to-digital conversion, and generates basebanded in-phase and quadrature (I&Q) data for each element output of forward-looking sonar 18. Data acquisition processor 22 also records a plurality of channels of the element level forward-looking sonar data. Element level recording of this data allows for a variety of processing algorithms to be performed on the sonar data. In one embodiment, side-looking sonar 20 includes an internal analog-to-digital converter (not shown) that digitizes analog side-looking sonar data.

Sonar data gathering device 12 further includes a Doppler velocity sonar (DVS) 24 and an inertial navigation system (INS) 26, both of which are well known in the art. Doppler velocity sonar 24 and an inertial navigation system 26 cooperate to generate navigation and altitude data. A global positioning system or a differential global positioning system can be used in conjunction with Doppler velocity system 24 and inertial navigation system 26. Data acquisition processor 22 also digitizes and records data generated by Doppler velocity system 24 and inertial navigation system 26.

Forward-looking and side-looking sonars are known in the art and are described in U.S. Pat. Nos. 5,200,931 and 5,812,494, the disclosures of which are herein incorporated by reference. For purposes of testing the three-dimensional imaging module 16 of the present invention, a particular forward-looking sonar was used to realize forward-looking sonar 18. This particular forward-looking sonar is configured as a forward looking planar array designed for operation in a 21-inch diameter vehicle. It consists of 1264 half-wavelength elements configured in a 20 wavelength circular aperture having a design frequency of 87 kHz. A subset of the elements consisting of two rows of thirty-two elements each are chosen to provide single ping transmit coverage of approximately ninety degrees in azimuth by forty five degrees in elevation with a source level of approximately 205 dB. Wide-angle azimuthal transmit coverage is achieved by means of element phase shading. However, it is to be understood that this aforementioned forward-looking sonar is just one example and that other suitable forward-looking sonars can be used to provide the required forward-looking sonar data. One suitable commercially available side-looking sonar is the Klein System 2000 Model 2260 SLS Sonar Towfish. However, other suitable side-looking sonars can be used as well.

Sonar data gathering device 12 also includes a transmit transducer which is not shown but is well known in the art. In one embodiment, the transmit transponder is configured as a non-planar array.

Sonar data gathering device 12 can be realized by any one of a variety of devices that can maintain forward-looking and side-looking sonars 14 and 16, respectively. For example, device 12 can be an over-the-side unmanned underwater vehicle simulator such as that provided by French et al. in U.S. Pat. No. 6,085,683 or an autonomous unmanned underwater vehicle.

Data acquisition processor 22 enables the synchronized transfer of sonar data from sonar data gathering device 12 to data conversion module 14. Data acquisition processor 22 outputs digitized forward-looking sonar data 28, and digitized navigation and altitude data identified hereinafter as positional data 30. Side-looking sonar data 32 is fed directly into the data conversion module 14.

Data conversion module 14 generally comprises signal processing modules that implement particular signal processing algorithms on the sonar data received from sonar data gathering device 12. Data conversion module 14 comprises processors 34, 36 and 38 that process forward-looking sonar data 28 and positional data 30. Data conversion module 14 further comprises processor 40 that processes side-looking sonar data 32.

Processor 34 implements a bathymetric image processing algorithm on forward-looking sonar data 28. The ensuing description pertains to just one example of a bathymetric image processing algorithm that produces bathymetric data that is suitable for use by three-dimensional imaging module 16. However, it is to be understood that this is just one example and that other suitable bathymetric image processing algorithms can be used. The first step in the bathymetric processing is beamforming. The array element data are weighted with two-dimensional Chebyshev weights, such as a 28-dB ripple which yields a main beam that is about four degrees wide in the horizontal and vertical planes. The weighted elements are beamformed using a two-dimensional limited angle fast Fourier transform (FFT) beamformer. This beamformer produces sixteen elevation beams covering 0° to 30° degrees in declination angle, and thirty-two beams covering ±30° degrees in azimuth. All beams are spaced at angles corresponding to a one-hundred-twenty-eight point conventional FFT beamformer, which, over the aforesaid limited angle region, yields a nominal 2° beam separation. (The element data has been match-filtered prior to beamforming). The bathymetric beamset evolves as a subset of the volumetric processing beamset (described in the ensuing description) which forms significantly more beams than the number of array elements of the high-resolution array forward-looking sonar 18. Each vertical fan of sixteen beams, one for each of the thirty-two azimuths, is processed independently. The next step is normalization. In this step, the background level at each time sample is set to be the mean beam power level across all sixteen elevation beams. Bottom detections are those angles whose power is more than 6 dB above the background level. Detection peak angles are refined by a five point least-squares parabolic fit to the detection peak power and the powers of the four surrounding beams (two on either side of the peak). The maximum power response at each time sample (assuming there was a detection), together with the corresponding sample number and refined angle are stored. All time samples are processed as above before proceeding to outlier rejection. After the conclusion of systolic processing, a nine point sliding mean filter is run down the detected magnitude series. If the magnitude of the point under inspection is more than 3 dB less than the mean magnitude of the eight surrounding points, then the point under inspection is rejected. Next, the stored sample numbers and refined angles are used to convert from range-angle to depth below the sonar and horizontal distance from the sonar, using a straight-line propagation model. The depth-distance profile is then examined to reject depth outliers and areas exhibiting high depth variance. During the depth outlier rejection process, gaps in the depth-distance profile are identified and flagged. A gap is defined as a section of the depth-distance profile equal to or larger than five meters in which no detections are present. Lastly, a five sample sliding mean filter is applied to the depth profile (without crossing gaps) to produce the final smoothed depth-distance profile for a given azimuth. All thirty-two azimuths are simply concatenated to yield a single-ping bathymetric map. Multiple pings (as well as multiple runs) can be gridded and averaged to produce a multiple-ping bathymetric map. Bathymetric processor 34 outputs bathymetric data 42.

Volumetric processor 36 implements a volumetric processing algorithm on forward-looking sonar data 28. The ensuing description is just one example of a volumetric processing algorithm that produces processed forward-looking sonar data that is suitable for use by three-dimensional imaging module 16. However, it is to be understood that this is just one example and that other suitable volumetric processing algorithms can be used. The first step of this algorithm is beamforming. Beamforming is achieved via the application of a two-dimensional FFT to the complex element data. Although a 64×64 two-dimensional FFT is indicated, other suitable configurations may be implemented. The second stage, normalization, is implemented laterally across all beams. For each sample period, each beam is normalized by dividing the magnitude squared value of that beam by the median magnitude squared value of all beams. The next step is detection which thresholds the normalized magnitude squared beam data and then localizes the detections via a two-dimensional parabolic interpolation. The localized detections are transformed from range-angle space to Cartesian coordinates, and a spatial filter is applied to eliminate spurious detections. The parameters defining the spatial filter are highly dependent upon operational environment parameters, and hence, are subject to modification according to the quality of the interpretation of that environment. The fourth stage, clustering, employs a simple spherical clustering algorithm to group detections into larger related objects. The choice of the clustering radius (in this case ten meters) is dependent upon the density of detections, which in turn is a function of the detection threshold, the angular density of the beamformer, and the resolution of the individual beams. All clusters containing fewer than four detections are rejected as at least four discrete points are required to define a non-zero volume. Finally, the last stage of the process, parameter estimation, extracts information from each cluster to be utilized by higher level classification and association algorithms. Typical calculations include estimates of cluster centroids, eigenvalue decompositions to determine cluster extents, and determination of average and/or peak power values. Enhanced calculations such as estimates for cluster volumes, surface areas, and power densities are derived from the computation of three-dimensional convex hull data for each cluster. Volumetric processor 36 outputs detections and cluster data 44.

Planar processor 38 implements a planar processing algorithm on forward-looking sonar data 28 and data 30, which is outputted by Doppler velocity system 24 and inertial navigation system 26. The ensuing description pertains to just one example of a planar processing algorithm that data 28 and data 30 and outputs processed data that is suitable for use by three-dimensional imaging module 16. However, it is to be understood that this is just one example and that other suitable planar processing algorithms can be used. In this processing algorithm, beamforming is achieved in two stages. The first stage yields forty complex stave outputs. Amplitude weighting is performed so as to generate a mainbeam that measures approximately eight degrees in the vertical by four degrees in the horizontal. Thereafter, complex phase shading is applied to steer the elements to one elevation angle (elements in the same row receive the same complex weight). The elevation angle is a function of the water depth and the altitude of the vehicle. The elements in each column are then summed to form a set of forty stave outputs and processed via match filtering. The matched filter outputs are phaseshift-beamformed to one-hundred-twenty-eight beams in azimuth via a discrete Fourier transform (DFT) that is implemented with an FFT. The normalization step seeks to remove propagation and environmental effects from the range-azimuth map to provide an approximately constant rate of false alarm. At the range increment of interest, the median value across all eighty-one angle cells is computed. Each and every angle cell at the range increment in question is then normalized by the computed sample median. This step is repeated at each range increment. A threshold is applied to the normalized range-azimuth map to form a new map (e.g., a value corresponding to 16 dB). All cells with values equal to or greater than the threshold are given a value of one. The remaining cells are given a value of zero. This map is referred to as the binary image map and has all the attributes of a binary image so that subsequent image processing techniques can be use to extract information from it. A series of morphological operations are performed on the binary image map. This is done to group together threshold crossings from the normalized range-azimuth map to form "objects" that capture areas of localized, strong scattering from the bottom, and remain consistent in their structure and location from ping to ping. The primary morphological operation used is closure. Two closure operations are performed with two different structuring elements. The first different structuring element measures fourteen range cells (one meter) by one angle cell and the second measures seventy-two range cells (≈five meters) by one angle cell. The perimeter of each object is computed via a series of morphological operations and is ordered so that when perimeter pixels are connected, the line segments do not cross. The perimeters of each object are then converted to Cartesian coordinates. Planar processor 38 then outputs navigation and altitude data 46. In one embodiment, data 46 is in center-of-vehicle coordinates.

SLS Data processor 40 implements a processing algorithm on side-looking sonar data 32. The ensuing description pertains to just one example of a side-looking sonar data processing algorithm that processes side-looking sonar data 32 and outputs processed data that is suitable for use by three-dimensional imaging module 16. However, it is to be understood that this is just one example and that other suitable side-looking sonar data processing algorithms can be used. The first step in the side-looking sonar data processing is a byte scan that detects and corrects for missing bytes. After the data has been scanned, it is de-multiplexed and the desired channels of data are extracted. For example, the aforementioned Klein System 2000 Model 2260 SLS towfish is a single-beam sonar that operates simultaneously at 140 kHz and 400 kHz, producing receive beams that are 1 degree wide (along track) and 0.2 degree wide, respectively. Received acoustic data are sampled after application of an analog time-varying gain to lessen the effects of propagation loss. The sampled data channels are interleaved and stored in a data storage device. The interleaved channels contain data from the left and right receivers from both the 140 kHz and 400 kHz frequencies (4 channels total) as well as transmit synchronization pulses. Thus, the desired channels of data which are extracted, after demultiplexing, are the aforementioned four channels which contain data from the left and right receivers from both the 140 kHz and 400 kHz frequencies.

Next, the time-varying gain is adjusted to flatten out the acoustic response near nadir, which is somewhat overemphasized by the built-in, fixed, analog time-varying gain. The left and right halves of each receiver are combined into a single scan-line then corrected for slant range by using a software altitude tracker and assuming straight-line propagation. The scan-line is rotated to the heading of the towfish and then translated to a georeference using filtered data from a differential global positioning system. The position-corrected scan-line is then gridded to a 0.5-meter rectangular lattice using a 2-meter radius, circular, gridding template, and inverse-distance weights. Overlaps between multiple scan-lines are resolved by computing the mean acoustic response at each lattice point. The gridded data are scaled from 2-byte integers to 1-byte integers (for disk space considerations) and stored in a binary file. Processor 40 outputs processed side-looking sonar data 48.

Processors 34, 36, 38 and 40 may be realized by commercially available digital signal processing (DSP) cards.

Figure 2:
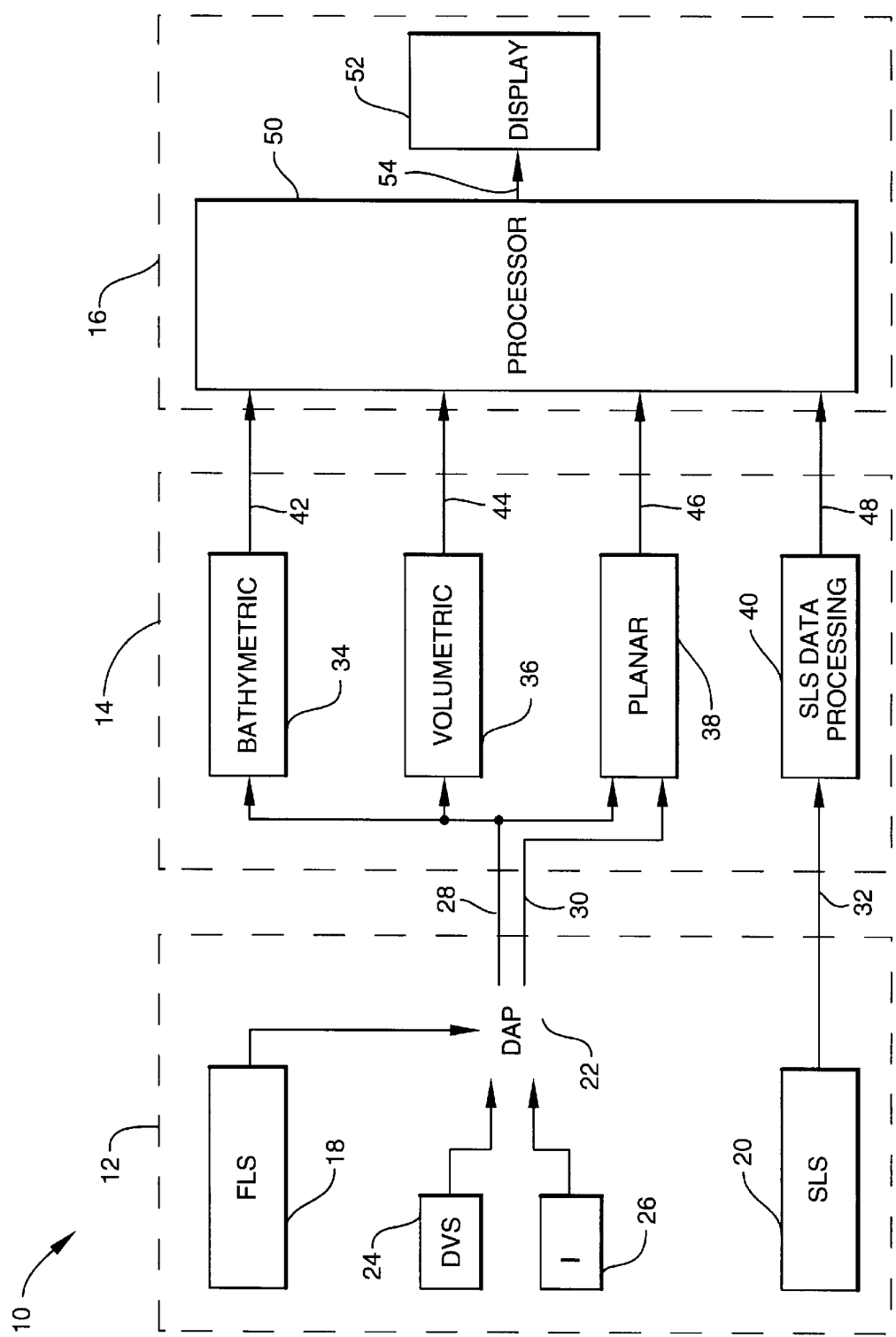

Referring to FIGS. 1 and 2, three-dimensional imaging module 16 generally comprises processor 50 and display device 52. Processor 50 includes a scenegraph-based applications programmer interface (also known as OpenGL scenegraph-based applications programmer interface). The scenegraph-based applications programmer interface enables processor 50 to render a three-dimensional image of the ensonified region based upon data streams 42, 44, 46 and 48. Other control circuitry such as a central processing unit (CPU), clock circuitry, and data interface circuitry, all of which not being shown but well known in the art, are also included in three-dimensional imaging module 16. In one embodiment, module 16 is realized by a computer having adequate RAM and ROM storage capacity and a high-speed microprocessor.

Processor 50 is configured to receive and process data streams 42, 44, 46 and 48 so as to generate a three-dimensional image of the ensonified regions. Processor 50 processes data 46 so as to convert the center-of-vehicle coordinates into center-of-range coordinates. Processor 50 then converts the center-of-range coordinates into center-of-scenebounding coordinates.

Processor 50 is configured to effect polygonal rendering of all geometry objects in order to produce the three-dimensional image of the ensonified region. Thus, processor 50 first processes data 42, 44 and 48 so as to translate this data to geometry objects. The nodes of any scenegraph generated by processor 50 will be comprised of the geometry objects.

Processor 50 performs triangular rendering on the detection and cluster data 44 so as to produce corresponding geometry objects. The technique of triangular rendering is well known in the art and is also known as faceting. Processor 50 also generates tri-strips from bathymetric data 42 so as to produce geometry objects. The technique of generating tri-strips is also well known in the art. Side-looking sonar data 48 is in an X, Y coordinate configuration. Processor 50 is configured to implement the process described in Medeiros U.S. Pat. No. 5,812,494, the disclosure of which is incorporated herein by reference, which effects conversion of the two-dimensional side-looking sonar data 48 into a format having three dimensions. This results in a depth dimension or Z dimension being added to of the two-dimensional side-looking sonar data 48. Processor 50 then converts the three-dimensional formatted side-looking sonar data into geometry objects.

Processor 50 is then renders a three-dimensional image of the ensonified region wherein the image is based on geometry objects generated from bathymetric data 42, detection and cluster data 44, and the three-dimensional formatted side-looking sonar data. In order for processor 50 to render the aforesaid three-dimensional image, processor 50 is configured to (i) generate a bathymetric map based on the geometry objects corresponding to the bathymetric data, (ii) generate a map defining detections and clusters based on the geometry objects corresponding to the detection and cluster data, (iii) generate a map defining the ocean floor sediment type based on the geometry objects corresponding to the bathymetric data and detection and cluster data, (iv) generate a multi-level gray scale map of the three-dimensional side-looking sonar data, and (v) color-code the bathymetric map, and the maps defining the detections, clusters and ocean floor sediment type.

In one embodiment, processor 50 is configured so as to generate the multi-level gray scale map of the three-dimensional side-looking sonar data as a 256 level gray scale map.

Processor 50 is further configured to offset the position of all geometry objects in accordance with the center-ofscenebounding coordinates. Processor 50 outputs data 54 which defines the rendered three-dimensional image for input into display device 52. In a preferred embodiment, display device 52 is realized by a high-resolution color monitor (e.g., 1280×1024 monitor).

As will be apparent from the forgoing and ensuing descriptions, processor 50 controls the overall flow of the data being read and displayed on display 52 provides: (i) graphical user interface functions, (ii) initialization of data communication sockets, (iii) generation of a graphics scene including the culling of objects not in the scene as well as the calculation of the proper perspective for all objects in the scene, (iv) the manipulation and movement of objects in a scene, (v) the calculation of the level-of-detail of objects based upon their distance from the viewpoint, (vi) the creation and display of texture maps representing navigation charts of the area as well as the water's surface and other pixel maps of objects that enhance the scene, and (vii) the creation of bathymetry and cluster/detection objects for inclusion in a scene.

Three-dimensional imaging module 16 comprises a graphical user interface (not shown) that is in data communication with processor 50 and display device 52. In one embodiment, the graphical user interface includes a keyboard and a plurality of control devices, e.g., buttons, knobs, etc. (not shown) that enable a user to control the display of data. In a preferred embodiment, each control device has a corresponding keyboard command. Specifically, the graphical user interface includes a reset control device that implements a reset function wherein the display device 52 is returned to a default state that was initially set when operation of processor 50 was initiated. The reset function provides the overall scene with a roll, pitch, and yaw of zero. The reset function does not turn off objects such as vessel models or bathymetry maps that are being displayed. The purpose of the reset function is to bring the viewer back to a known starting point. In a preferred embodiment, the reset function always sets the scene to the lowest level-of-detail. The graphical user interface further includes a level-of-detail control device that enables the user to vary the level-of-detail of the images being displayed on display device 52.

The graphical user interface further includes control devices (not shown) that enable the user to display or prevent the display of the navigation grid, the bottom/sediment map, high-resolution bathymetry maps, gridded sidescan sonar data that corresponds to the high-resolution bathymetry maps, texture-mapped water surface, and clusters.

The graphical user interface further comprises a control device that configures the image displayed on display device 52 so that the image can either be in or out of the forward-looking sonar boresight viewpoint.

The graphical user interface further includes a control device that implements a function that enables a user to turn on and off particular objects within the scene. Thus, this function enables the user to view the scene unobstructed by objects extraneous to the bathymetry, sidescan or detection/cluster objects.

The graphical user interface further comprises a control device that implements a function that enables a viewer to change the intensity of the light reflected off objects in the scene. This is accomplished by changing the original material of the object, which has particular reflection characteristics, to a default material which has predetermined reflection characteristics. The default material has no ambient light associated with it, so the effect of turning lighting off is to remove shadows and remove colors. It has been found that turning off the ambient light source does not greatly affect other objects such as the sidescan sonar map, the vehicle models, or navigation charts because those objects are not created with a diffuse color scheme. Thus, the angle of the ambient light is not critical to their presentation as it is to the bathymetry maps.

In one embodiment, the graphical user interface of three-dimensional imaging module 16 is configured to allow the use of sliders thereby enabling a user to vary a set of inputs to processor 50. Specifically, the sliders enable a user to adjust the field of view and adjust the interocular distance for 3-D glasses.

Processor 50 is also configured to use vehicle position-dynamics-ping files (VPDP) that are either locally stored or obtained through externally communicating sockets. In such a configuration, when the operation of processor 50 is initiated, processor 50 searches for and loads bathymetry and detection/cluster data files. These files have no times assigned or attached to them when they are loaded. However, the VPDP files are loaded chronologically based upon their time of occurrence from the beginning of a vehicle's run. Within the VPDP files, there are a series of ones and zeroes in the next-to-last data column. If the number one is present in the next-to-last data column, it means that a run event corresponding to that time did occur. Processor 50 is configured to step through the events it loaded on start-up, one-by-one, as each of the run event markers occur. Processor 50 functions in this manner even when it receives VPDP files from an outside source. When processor 50 receives VPDP files from an outside source, processor 50 constantly compares the incoming time to the time currently pointed to in the VPDP file. If the time is greater than or equal to the time to which the pointer is pointing, then processor 50, in conjunction with display device 52, displays the run event associated with that time. Processor 50 then increments the pointer to the next time in the VPDP file. In the event that the next time in the VDPD file corresponds to a vehicle position without an associated run, the VPDP file will contain a zero in the next-to-last data column. Thus, processor 50 will not cause that particular data file to be displayed since the next-to-last data column did not contain the number one.

Processor 50 is configured with the appropriate software to effect the automatic opening of communication sockets to other software programs implemented on other sonar data processing modules thereby facilitating a seamless transfer of function for reading either prerecorded or real time data. For example, if a separate sonar data processing module is configured to process side-looking sonar data with a visualization software program, processor 50 can open a communication socket with the visualization software program in order to obtain the current coordinates of the vehicle as displayed by the visualization software program. As a result, processor 50 can effect movement of the vehicle icon to the appropriate location in the scene and displays ancillary information associated with that position such as the display of bathymetric and/or cluster/detection data as well as the roll, pitch, heading, and depth of the vehicle for that position.

Processor 50 can also be used to process pre-stored sonar data for purposes of testing, training or education. In such a configuration, a data storage device having sufficient data storage capacity stores (i) gridded side-looking sonar data maps, (ii) three-dimensional bathymetry maps, (iii) three-dimensional detection/cluster files, (iv) texture maps of the navigation charts of the test area, and (v) three-dimensional models representing vehicles, targets and other stationary and moving objects germane to the test. The capability of processor 50 to present this data simultaneously provides the viewers with a complete picture of both the environment the sonar sees and the total environment in which the sonar operates. The resulting comparative knowledge can be used to formulate improved classification algorithms and vehicle tactics for optimizing target detection, target classification and vehicle navigation in littoral environments.

The present invention can be embodied in the form of computer processor readable program code embodied in a computer processor usable medium, such as floppy diskettes, CD-ROMs, hard drives, or any other computer-readable storage medium, wherein, when the computer program code is loaded into and executed by a computer, the computer becomes an integral part of an apparatus for practicing the invention.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method of generating a three-dimensional image of a region ensonified by a source of acoustic signals, comprising the steps of:

providing sonar data corresponding to the ensonified region, the sonar data including side-looking sonar data, bathymetric sonar data, detection and cluster data, and navigation data and altitude data relating to the position and movement of the receiver of acoustic signals;

processing the navigation and altitude data so as to format the navigation and altitude data into center-of-scenebounding coordinates;

processing the detection and cluster data in order to generate detection and cluster geometry objects;

processing the bathymetric data in order to produce bathymetric geometry objects;

processing the side-looking sonar data to produce side-looking sonar geometry objects;

rendering a three-dimensional image based on the detection and cluster, the bathymetric and the side-looking sonar geometry objects;

offsetting the position of all geometry objects in accordance with the center-of-scenebounding coordinates; and displaying the rendered three-dimensional image.

2. The method according to claim 1 wherein the navigation and altitude data is originally configured in center-of-vehicle coordinates, the step of processing the navigation and altitude data comprising the steps of:

converting the center-of-vehicle coordinates into center-of-range coordinates; and converting the center-of-range coordinates into center-of-scenebounding coordinates.

3. The method according to claim 1 wherein the step of processing the detection and cluster data comprises the step of effecting triangular rendering of the detection and cluster data to produce the geometry objects based on the detection and cluster data.

4. The method according to claim 1 wherein the step of processing the bathymetric data comprises the step of generating tri-strips based on the bathymetric data in order to produce the geometry objects based on the bathymetric data.

5. The method according to claim 1 wherein the step of processing the side-looking sonar data comprises the steps of:

converting the side-looking sonar data into three-dimensional side-looking sonar data; and converting the three-dimensional sonar data into the geometry objects.

6. The method according to claim 5 wherein the step of rendering the three-dimensional includes generating a multi-level gray scale map from the three-dimensional side-looking sonar data.

7. The method according to claim 1 wherein the step of rendering a three-dimensional image includes generating a bathymetric map based on the geometry objects corresponding to the bathymetric data.

8. The method according to claim 1 wherein the step of rendering a three-dimensional image includes generating a map defining detections and clusters based on the geometry objects corresponding to the detection and cluster sonar data.

9. The method according to claim 1 wherein the step of rendering a three-dimensional image includes generating a map defining the ocean floor sediment type based on the geometry objects corresponding to the bathymetric sonar data and detection and cluster sonar data.

10. A three-dimensional imaging system for use with a sonar system that provides side-looking sonar data, bathymetric data, detection and cluster data, and navigation data and altitude data, the three-dimensional imaging system comprising:

data receiving circuitry for receiving the side-looking sonar data, bathymetric data, detection and cluster data and navigation data and altitude data;

a processor joined to said data receiving circuitry for (i) converting the received navigation and altitude data into center-of-scenebounding coordinates, (ii) processing the received detection and cluster data so as to produce geometry objects, (iii) processing the received bathymetric data so as to produce geometry objects, (iv) processing the received side-looking sonar data to produce geometry objects, (v) rendering a three-dimensional image comprising the geometry objects based on the detection and cluster data, the bathymetric data and the side-looking sonar data, and (vii) offsetting the position of all geometry objects in accordance with the center-of-scenebounding coordinates; and a display device joined to said processor for displaying the rendered three-dimensional image.

11. The system according to claim 10 wherein the navigation and altitude data is originally configured in center-of-vehicle coordinates, the processor being configured to convert the center-of-vehicle coordinates into center-of-range coordinates upon receipt of the navigation and altitude data by the data receiving circuitry.

12. The system according to claim 10 wherein the processor includes means for effecting triangular rendering of the detection and cluster data to produce the geometry objects based on the detection and cluster data.

13. The system according to claim 10 wherein the processor includes means for generating tri-strips based on the bathymetric data in order to produce the geometry objects based on the bathymetric data.

14. The system according to claim 10 wherein the processor includes means for:

converting the side-looking sonar data into three-dimensional side-looking sonar data; and converting the three-dimensional sonar data into the geometry objects.

15. The system according to claim 10 wherein the processor is configured to render the three-dimensional image such that the image includes a bathymetric map based on the geometry objects corresponding to the bathymetric data.

16. The system according to claim 15 wherein the processor is further configured to render the three-dimensional image such that the image includes a map defining detections and clusters based on the geometry objects corresponding to the detection and cluster sonar data.

17. The system according to claim 16 wherein the processor is further configured to render the three-dimensional image such that the image includes a map defining the ocean floor sediment type based on the geometry objects corresponding to the bathymetric sonar data and detection and cluster sonar data.

18. The system according to claim 17 wherein the processor is further configured to render the three-dimensional image such that the image includes a multi-level gray scale map of the three-dimensional side-looking sonar data.

19. A sonar system, comprising:

a sonar data gathering device comprising a forward-looking sonar, a side-looking sonar, a device for generating navigation and altitude data configured in center-of-vehicle coordinates, and a data acquisition processor for storing and digitizing data produced by the forward-looking sonar and the navigation and altitude data;

a data conversion module for processing the (i) digitized forward-looking data to produce bathymetric data and detection and cluster data, (ii) navigation and altitude data to convert center-of-vehicle coordinates into center-of-range coordinates, and (iii) side-looking sonar data to form a grid map;

a processor for (i) converting the center-of-range coordinates into center-of-scenebounding coordinates, (ii) performing triangular rendering on the detection and cluster data so as to produce geometry objects, (iii) generating tri-strips from the bathymetric data so as to produce geometry objects, (iv) converting the side-looking data into a format having three dimensions, (v) converting the three-dimensional formatted side-looking sonar data into geometry objects, (vi) rendering a three-dimensional image comprising the geometry objects based on the detection and cluster data, the bathymetric data and the three-dimensional formatted side-looking sonar data, and (vii) offsetting the position of all geometry objects in accordance with the center-of-scenebounding coordinates; and a display device for displaying the rendered three-dimensional image.

20. The system according to claim 19 wherein the processor is configured to render the three-dimensional image such that the image includes a bathymetric map based on the geometry objects corresponding to the bathymetric data, a map defining detections and clusters based on the geometry objects corresponding to the detection and cluster sonar data, a map defining the ocean floor sediment type based on the geometry objects corresponding to the bathymetric sonar data and detection and cluster sonar data, and a multi-level gray scale map of the three-dimensional side-looking sonar data.

* * * * *